United States Patent
Ge (10) Patent No.: US 9,500,124 B2
(45) Date of Patent: Nov. 22, 2016

(54) HYBRID POWERTRAIN AND METHOD FOR OPERATING SAME

(71) Applicant: Caterpillar Inc., Peoria, IL (US)

(72) Inventor: Xinyu Ge, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 112 days.

(21) Appl. No.: 14/540,681

(22) Filed: Nov. 13, 2014

(65) Prior Publication Data

US 2016/0138466 A1    May 19, 2016

(51) Int. Cl.
| | |
|---|---|
| *F02B 33/44* | (2006.01) |
| *B60W 10/00* | (2006.01) |
| *B60K 1/02* | (2006.01) |
| *F01D 15/10* | (2006.01) |
| *F02B 61/06* | (2006.01) |
| *B60W 20/00* | (2016.01) |
| *F02B 37/12* | (2006.01) |
| *F02B 63/04* | (2006.01) |

(52) U.S. Cl.
CPC .............. *F02B 61/06* (2013.01); *B60W 20/10* (2013.01); *F02B 37/12* (2013.01); *F02B 63/04* (2013.01); *Y10S 903/903* (2013.01)

(58) Field of Classification Search
CPC ........ F02B 61/02; F02B 61/06; F02B 37/12; F02B 37/10; F02B 63/04; F02B 63/041; F02B 39/04; F02B 39/06; F02B 39/10; B60W 20/10; B60W 10/08; Y10S 903/903
USPC ............ 60/607–608; 180/65.2, 65.4, 65.265; 477/3; 290/52; 903/903
See application file for complete search history.

(56) References Cited

U.S. PATENT DOCUMENTS

| | | | | |
|---|---|---|---|---|
| 4,109,743 A | * | 8/1978 | Brusaglino | B60L 11/04 180/65.245 |
| 4,183,420 A | * | 1/1980 | Kinoshita | B60K 3/04 180/65.25 |
| 4,578,955 A | * | 4/1986 | Medina | B60W 10/08 180/65.25 |
| 6,110,066 A | * | 8/2000 | Nedungadi | B60W 10/08 475/5 |
| 6,647,724 B1 | * | 11/2003 | Arnold | F02B 39/10 60/608 |
| 6,931,850 B2 | * | 8/2005 | Frank | B60W 10/08 60/608 |
| 7,028,793 B2 | | 4/2006 | Hu et al. | |
| 7,076,954 B1 | | 7/2006 | Sopko, Jr. et al. | |
| 7,497,285 B1 | * | 3/2009 | Radev | B60W 10/06 180/65.225 |
| 7,765,806 B2 | * | 8/2010 | Clark | F02B 39/10 60/608 |

(Continued)

FOREIGN PATENT DOCUMENTS

DE    102008050815 A1    8/2010

*Primary Examiner* — Thai Ba Trieu (74) *Attorney, Agent, or Firm* — Baker & Hostetler LLP (57) ABSTRACT

A hybrid powertrain includes an internal combustion engine, a load coupled to the internal combustion engine via a mechanical transmission for transmission of a first shaft power therebetween, a turbine fluidly coupled to an exhaust of the internal combustion engine, a generator operatively coupled to the turbine for transmission of a second shaft power therebetween, and electrically coupled to an electric battery, a motor-generator operatively coupled to the mechanical transmission for transmission of a third shaft power therebetween, and electrically coupled to the electric battery; and a controller operatively coupled to the internal combustion engine. The controller is configured to adjust a relative proportion of the third shaft power compared to the first shaft power by adjusting at least one of a combustion timing of the internal combustion engine and an exhaust valve timing of the internal combustion engine.

19 Claims, 3 Drawing Sheets

(56) References Cited

U.S. PATENT DOCUMENTS

| | | | | |
|---|---|---|---|---|
| 7,958,727 B2* | 6/2011 | Arnold | | F02B 39/10 123/559.1 |
| 8,225,608 B2* | 7/2012 | Wu | | F02B 39/10 60/608 |
| 8,584,459 B2* | 11/2013 | Richards | | F02B 39/10 60/608 |
| 8,959,912 B2* | 2/2015 | Hoess | | F02B 39/10 60/608 |
| 8,991,172 B2* | 3/2015 | Shimizu | | F02B 39/10 60/608 |
| 2003/0116124 A1* | 6/2003 | Lawrence | | F01L 1/181 123/90.16 |
| 2003/0145582 A1* | 8/2003 | Bunting | | F02D 41/0235 180/65.245 |
| 2006/0046894 A1 | 3/2006 | Kyle | | |
| 2008/0210480 A1* | 9/2008 | Kraxner | | B60W 10/08 180/65.265 |
| 2012/0119509 A1 | 5/2012 | West | | |
| 2012/0125276 A1* | 5/2012 | Baldwin | | F02D 13/0269 123/90.17 |
| 2012/0273288 A1 | 11/2012 | Yamazaki et al. | | |
| 2012/0329603 A1 | 12/2012 | Yamazaki et al. | | |
| 2013/0174544 A1* | 7/2013 | Valetutti | | F02D 41/0007 180/65.265 |
| 2014/0172207 A1 | 6/2014 | Akashi et al. | | |
| 2014/0245979 A1* | 9/2014 | Tanis | | F01L 1/18 123/90.15 |
| 2015/0134160 A1* | 5/2015 | Liang | | B60W 10/06 180/65.265 |
| 2015/0360677 A1* | 12/2015 | Liang | | B60W 10/06 180/65.245 |
| 2016/0137193 A1* | 5/2016 | Johri | | B60W 10/06 180/65.265 |

* cited by examiner

HYBRID POWERTRAIN AND METHOD FOR OPERATING SAME

TECHNICAL FIELD

This patent disclosure relates generally to hybrid powertrains and, more particularly, to series-parallel hybrid powertrains and methods of operating the same.

BACKGROUND

Reciprocating internal combustion (IC) engines are known for converting chemical energy stored in a fuel supply into mechanical shaft power. A fuel-oxidizer mixture is received in a variable volume of an IC engine defined by a piston translating within a cylinder bore. The fuel-oxidizer mixture burns inside the variable volume to convert chemical energy in the mixture into heat. In turn, expansion of the combustion products within the variable volume performs work on the piston, which may be transferred to an output shaft of the IC engine.

Various combinations of IC engines, electrical generators, and electric motors are known for composing electric hybrid powertrains. In a serial hybrid powertrain, shaft power from an IC engine is coupled with an electric generator for producing electrical energy, but the shaft power is not directly coupled to a load via a mechanical transmission. Further according to serial electric hybrid designs, work is performed on loads by electric motors receiving power from the electric generator, an energy storage device (e.g., an electric battery), or both. In a series-parallel hybrid powertrain, shaft power from an IC engine is coupled to both an electric generator and a load via a mechanical transmission, such that work is performed on the load by shaft power from the engine, electrical power from the generator, electrical power from an energy storage device, or combinations thereof.

US Patent Publication No. 2012/0273288 (the '288 publication), entitled "Hybrid Vehicle," relates to a technology for collecting exhaust energy of an engine in a hybrid vehicle. The '288 publication purports to describe a hybrid vehicle capable of running using an engine and a motor as drive sources, including an exhaust turbine to be driven and rotated by exhaust of the engine; a generator which generates power by being driven and rotated by the exhaust turbine; and a power supply unit which supplies electric power generated by the generator to a motor.

The crankshaft of the engine and the motor of the '288 publication are arranged on the same axis, and torques from the engine and the motor are transmitted in the same rotational manner to the transmission. However, arranging the motor on the same axis as the crankshaft of the engine may not suit some applications, but instead impose undue constraint on the cost, complexity, packaging, and operability of a hybrid vehicle so configured. Accordingly, the present disclosure addresses the aforementioned problems and/or other problems in the art.

SUMMARY

According to an aspect of the disclosure, a hybrid powertrain comprises an internal combustion engine; a load coupled to the internal combustion engine via a mechanical transmission for transmission of a first shaft power therebetween; a turbine fluidly coupled to an exhaust of the internal combustion engine; a generator operatively coupled to the turbine for transmission of a second shaft power therebetween, and electrically coupled to an electric battery; a motor-generator operatively coupled to the mechanical transmission for transmission of a third shaft power therebetween, and electrically coupled to the electric battery; and a controller operatively coupled to the internal combustion engine. The controller is configured to adjust a relative proportion of the third shaft power compared to the first shaft power by adjusting at least one of a combustion timing of the internal combustion engine and an exhaust valve timing of the internal combustion engine.

According to another aspect of the disclosure a machine comprises a hybrid powertrain. The hybrid powertrain includes an internal combustion engine; a load coupled to the internal combustion engine via a mechanical transmission for transmission of a first shaft power therebetween; a turbine fluidly coupled to an exhaust of the internal combustion engine; a generator operatively coupled to the turbine for transmission of a second shaft power therebetween, and electrically coupled to an electric battery; a motor-generator operatively coupled to the mechanical transmission for transmission of a third shaft power therebetween, and electrically coupled to the electric battery; and a controller operatively coupled to the internal combustion engine. The controller is configured to adjust a relative proportion of the third shaft power compared to the first shaft power by adjusting at least one of a combustion timing of the internal combustion engine and an exhaust valve timing of the internal combustion engine.

According to another aspect of the disclosure, a method for operating a hybrid powertrain is provided. The method comprises transmitting a first shaft power from an internal combustion engine to a load via a transfer gear box; extracting a second shaft power from an exhaust flow of the internal combustion engine via a first turbine; transmitting the second shaft power from the turbine to a generator; transmitting a first electrical power from the generator to a motor-generator; transmitting a third shaft power from the motor-generator to the load via the transfer gear box; and adjusting a relative proportion of the third shaft power compared to the first shaft power by adjusting at least one of a combustion timing of the internal combustion engine and an exhaust valve timing of the internal combustion engine.

DETAILED DESCRIPTION

Aspects of the disclosure will now be described in detail with reference to the drawings, wherein like reference numbers refer to like elements throughout, unless specified otherwise.

Figure 1:
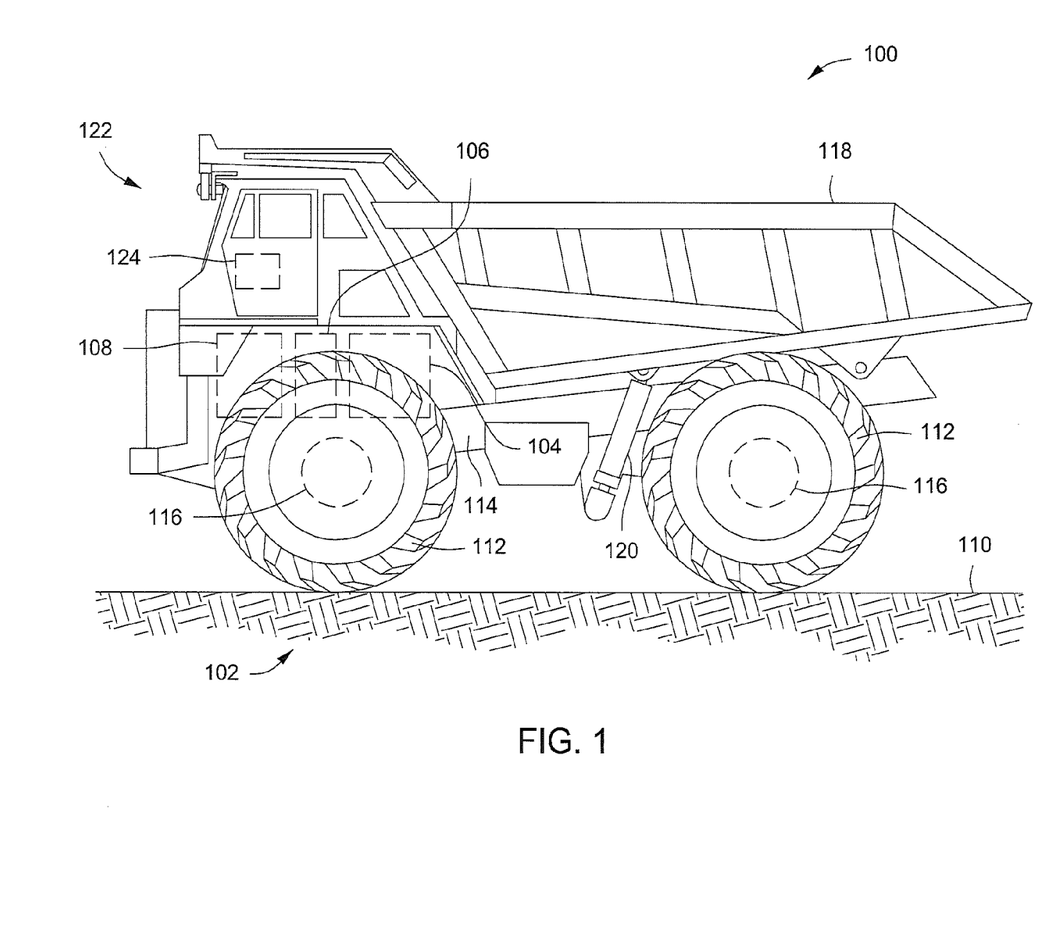
FIG. 1 shows a side view of a machine, according to an aspect of the disclosure.

FIG. 1 shows a side view of a machine 100, according to an aspect of the disclosure. The machine 100 is powered by a hybrid powertrain 102, which includes an internal combustion (IC) engine 104, a generator 106, and an energy storage device 108. The IC engine 104 maybe a reciprocating internal combustion engine, such as a compression ignition engine or a spark ignition engine, for example, or a rotating internal combustion engine, such as a gas turbine, for example. The energy storage device 108 may include electric batteries, a capacitor, a flywheel, a resilient fluid accumulator, combinations thereof, or any other energy storage device known in the art. The generator 106 may include an electric generator, a hydraulic pump, a pneumatic compressor, combinations thereof, or any other device known in the art for converting mechanical shaft power in to another type of power.

The machine 100 may be propelled over a work surface 110 by wheels 112 coupled to a chassis 114. The wheels 112 may be driven by motors 116, a mechanical transmission coupled to the IC engine 104 (see FIG. 2), or combinations thereof. It will be appreciated that the machine 100 could also be propelled by tracks (not shown), combinations of wheels 112 and tracks, or any other surface propulsion device known in the art. Alternatively, the machine 100 could be a stationary machine, and therefore may not include a propulsion device.

The machine 100 may also include a work implement 118 driven by an actuator 120. The work implement 118 could be a dump bed, a shovel, a drill, a fork lift, a feller-buncher, a conveyor, or any other implement known in the art for performing work on a load. The actuator 120 may be a hydraulic actuator, such as a linear hydraulic actuator or a hydraulic motor, an electric motor, a pneumatic actuator, or any other actuator known in the art.

The machine may include a cab 122 configured to accommodate an operator, and have a user interface 124 including using input devices for asserting control over the machine 100. The user interface 124 may include pedals, wheels, joysticks, buttons, touch screens, combinations thereof, or any other user input device known in the art. Alternatively or additionally, the user interface 124 may include provisions for receiving control inputs remotely from the cab 122, including wired or wireless telemetry, for example.

The machine can be an "over-the-road" vehicle such as a truck used in transportation or may be any other type of machine that performs some type of operation associated with an industry such as mining, construction, farming, transportation, or any other industry known in the art. For example, the machine may be an off-highway truck, earthmoving machine, such as a wheel loader, excavator, dump truck, backhoe, motor grader, material handler, or the like. The term "machine" can also refer to stationary equipment like a generator that is driven by an internal combustion engine to generate electricity. The specific machine 100 illustrated in FIG. 1 is a dump truck having a dump bed 118 actuated by a linear hydraulic cylinder 120.

Figure 2:
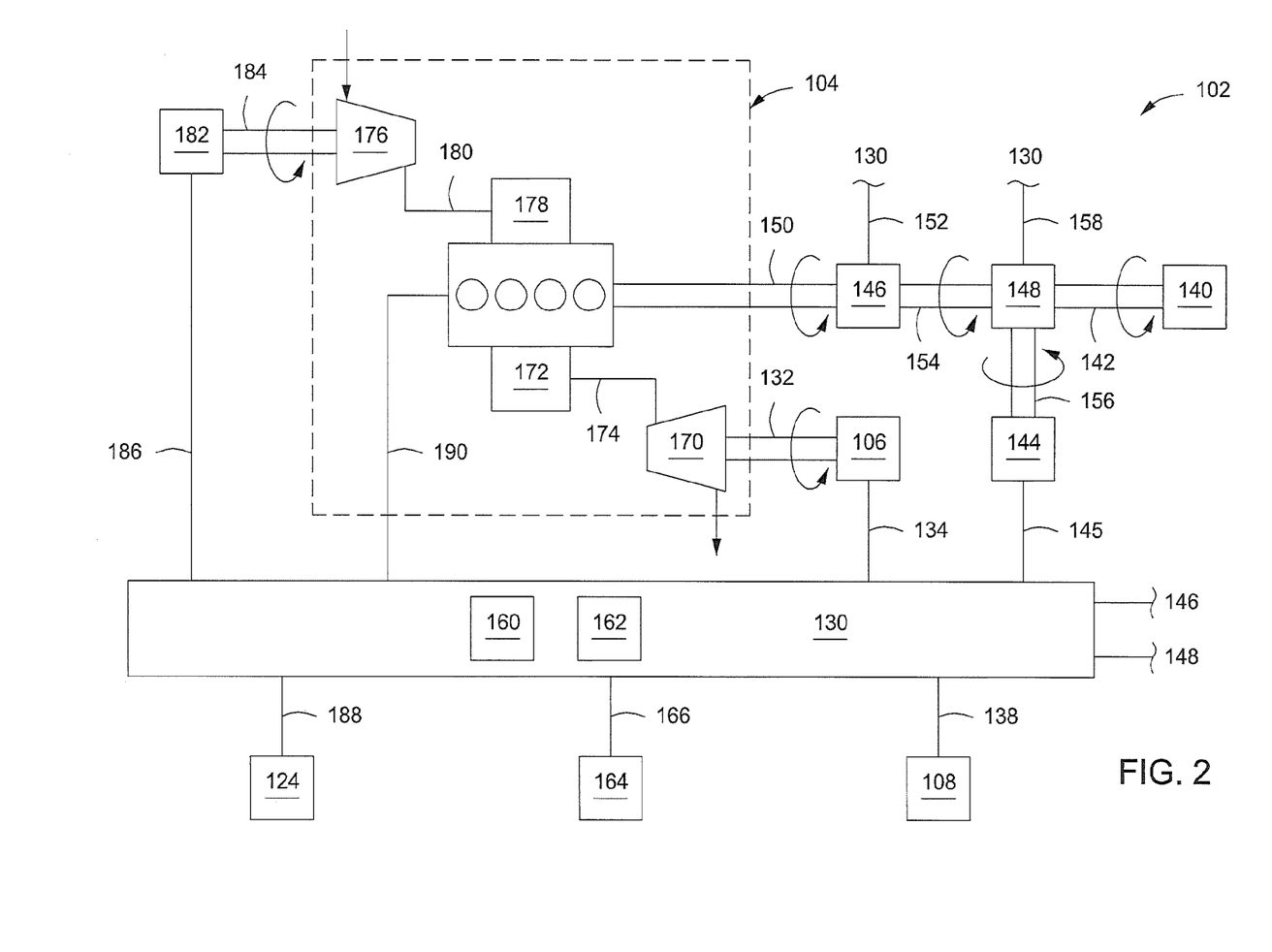
FIG. 2 shows a schematic view of a hybrid powertrain, according to an aspect of the disclosure.

FIG. 2 shows a schematic view of a hybrid powertrain 102, according to an aspect of the disclosure. The hybrid powertrain 102 includes an IC engine 104, a generator 106, an energy storage device 108, and a controller 130. The IC engine 104 is operably coupled to the generator 106 via a shaft 132 for transmitting mechanical power therebetween.

The generator 106 is electrically coupled to the controller 130 via an electrical connection 134 for transmitting electric power therebetween. It will be appreciated that the generator 106 may simultaneously receive electrical power from the controller 130 for excitation of a magnetic field therein and for transmitting electric power to the controller 130. The electrical connection 134 may also provide a data connection for receiving sensor signals from the generator 106, adjusting operating parameters such as magnetic field strength, for example, combinations thereof, or communicating any other data known in the art to be relevant to operation of the generator 106.

According to an aspect of the disclosure, the energy storage device 108 includes an electric battery that is electrically coupled to the controller 130 via an electrical connection 138 for transmitting electric power therebetween. Accordingly, the energy storage device 108 may deliver electric power to the controller 130 or receive electric power from the controller 130 via the electrical connection 138. The electrical connection 138 may also provide a data connection for receiving sensor signals from the energy storage device 108, such as sensor signals indicative of a state of charge of the electric battery, a temperature of the electric battery, combinations thereof, or any other data known in the art to be relevant to operation of the energy storage device 108.

The hybrid powertrain 102 may be coupled to at least one load 140 via a shaft 142. According to an aspect of the disclosure, the load 140 is a wheel 112 for propelling a machine 100 over a work surface 110, and the shaft 142 is a rotating shaft. According to another aspect of the disclosure, the load 140 is a work implement 118 of a machine 100, and the shaft 142 may rotate or translate relative to the work implement 118. According to another aspect of the disclosure, the load 140 is a hydraulic pump of a machine 100, and the shaft 142 may rotate or translate relative to the hydraulic pump. Although FIG. 2 shows only one load 140 coupled to the hybrid powertrain 102, it will be appreciated that the hybrid powertrain 102 may be coupled to any number of loads or any type of load known in the art, to suit a particular design or purpose.

The shaft 142 transmits mechanical power from the hybrid powertrain 102 to the load 140 to perform work on the load 140. Mechanical power transmitted to the load 140 may be generated by the IC engine 104, a motor-generator 144, combinations thereof, or any other mechanical power generating device known in the art. Mechanical power may be transmitted from the IC engine 104 to the load 140 via a transmission 146 and a transfer gear box 148, and mechanical power may be transmitted from the motor-generator 144 to the load 140 via the transfer gear box 148, for example.

The motor-generator is operatively coupled to the controller 130 via an electrical connection 145. The electrical connection 145 may communicate actuating signals and/or actuating power to the motor-generator 144, including, for example, electrical power to a rotor of the motor-generator 144, a stator of the motor-generator 144, or both.

The transmission 146 is operatively coupled to the IC engine 104 via a shaft 150. The transmission 146 may have two or more discrete gear combinations that may be shifted manually by a user or shifted according to an automatic shifting schedule. Alternatively, the transmission 146 may be a continuously variable transmission (CVT) that provides a substantially continuous spectrum of gear ratios between a maximum gear ratio and a minimum gear ratio. The transmission 146 may be operatively coupled to the controller 130 via an electrical connection 152, such that the electrical connection 152 may communicate control signals to the transmission 146, may communicate actuating power to actuators in the transmission 146, such as clutches, combinations thereof, or any other communication known in the art to benefit operation of the transmission 146.

The transfer gear box 148 may be operatively coupled to the transmission 146 via a shaft 154, and operatively coupled to the motor-generator 144 via a shaft 156. The transfer gear box 148 may be configured to transfer mechanical power between the IC engine 104, the load 140, and the motor-generator 144. Further, the transfer gear box 148 may be coupled to the controller 130 via an electrical connection 158 for communication of actuating signals or actuating power therewith. For example, the electrical connection 158 may communicate an actuating signal and/or actuating power to a clutch within the transfer gear box 148 to tailor the allocation of mechanical power among the IC engine 104, the motor-generator 144, and the load 140. According to an aspect of the disclosure, the transfer gear box 148 includes an epicyclic gear assembly. According to another aspect of the disclosure, the transfer gear box 148 does not include an epicyclic gear assembly.

The shaft 142 may also transmit power from the load 140 to the hybrid powertrain 102 to perform work on the hybrid powertrain 102. For example, work performed on the hybrid powertrain 102 by the load 140 may be used to regeneratively store energy in the energy storage device 108 via the motor-generator 144, during the braking of a wheel 112, resisting the lowering of a load 140 in a gravity direction, decelerating an inertia of a work implement load 140, or any other regenerative processes known in the art. During such regenerative events, the motor-generator 144 may be operated as a generator to convert mechanical shaft power at the shaft 156 into electrical power delivered to the controller 130 via the electrical connection 145. It will be appreciated that the controller 130 may include a rectifier 160 for converting alternating electrical current into direct electrical current, an inverter 162 for converting direct electric current into alternating electrical current, or both.

The controller 130 may be electrically coupled to an electric grid 164 via an electrical connection 166 for transmitting electrical power therebetween. According to an aspect of the disclosure, the electrical connection 166 may be intermittent at the discretion of a user of the hybrid powertrain 102.

The IC engine 104 includes a turbine 170 in fluid communication with an exhaust manifold 172 of the IC engine via an exhaust conduit 174. The turbine 170 is operatively coupled to the generator 106 via the shaft 132, and is configured to transfer mechanical power extracted from a flow of exhaust gas through the exhaust conduit 174 to the generator 106 via the shaft 132.

According to an aspect of the disclosure, the mechanical coupling between the turbine 170 and the generator 106 includes a gear assembly, which allows the generator to rotate at a lower speed than the turbine 170. According to an aspect of the disclosure, the mechanical coupling between the turbine 170 and the generator 106 is free from any gearing, such that a rotational speed of the turbine 170 is the same as the rotational speed of the generator 106.

The IC engine 104 may include a compressor 176 in fluid communication with an intake manifold 178 of the IC engine 104 via an intake conduit 180. The compressor 176 is operatively coupled to a motor 182 via a shaft 184, and is configured to transfer mechanical power from the motor 182 to the compressor 176 to compress a flow of oxidizer delivered to the IC engine 104 via the intake conduit 180. The motor 182 is coupled to the controller 130 via an electrical connection 186 for communication of actuating signals, actuating power, combinations thereof, or any other communication known in the art to benefit operation of the motor 182.

The controller 130 may be in data communication with the user interface 124 via a data connection 188 for receiving control inputs from a user of the hybrid powertrain 102. Further, the controller 130 may be in data communication with the IC engine 104 via a data connection 190 for receiving sensor signals from the IC engine 104, delivering control inputs to the IC engine 104, combinations thereof, or for transmitting any data known in the art to be relevant to operation of the IC engine 104. It will be appreciated that the data connections between the IC engine 104, the energy storage device 108, the generator 106, the user interface 124, the motor-generator 144, the transmission 146, the transfer gear box 148, the motor 182 and the controller 130 may include wired connections, wireless connections, combinations thereof, or any other data communication means known in the art.

The controller 130 may be any purpose-built processor for effecting control of the hybrid powertrain 102. It will be appreciated that the controller 130 may be embodied in a single housing, or a plurality of housings distributed throughout the hybrid powertrain 102. Further, the controller 130 may include power electronics, preprogrammed logic circuits, data processing circuits, volatile memory, non-volatile memory, software, firmware, combinations thereof, or any other controller structures known in the art.

The controller 130 may be configured to transfer electric power between the several components of the hybrid powertrain 102. During a recharging mode, for example, the controller 130 may direct electric power from the electric grid 164, the motor-generator 144, the generator 106, or combinations thereof to the energy storage device 108 for storage of energy therein. Alternatively or additionally, the controller 130 may direct electric power from the electric grid 164 to the motor-generator 144 for performing work on a load 140, or to the motor 182 for compressing an oxidizer flow to the IC engine 104.

According to another aspect of the disclosure, the controller 130 is configured to direct electric power output from the generator 106 to the energy storage device 108, the motor-generator 144, the motor 182, or combinations thereof. According to another aspect of the disclosure, the controller 130 may be configured to turn off the IC engine 104 and direct electrical energy from the energy storage device 108 to the motor-generator 144 for performing work on the load 140, to the motor-generator 144 for restarting the IC engine, to the motor 182, or combinations thereof.

Figure 3:
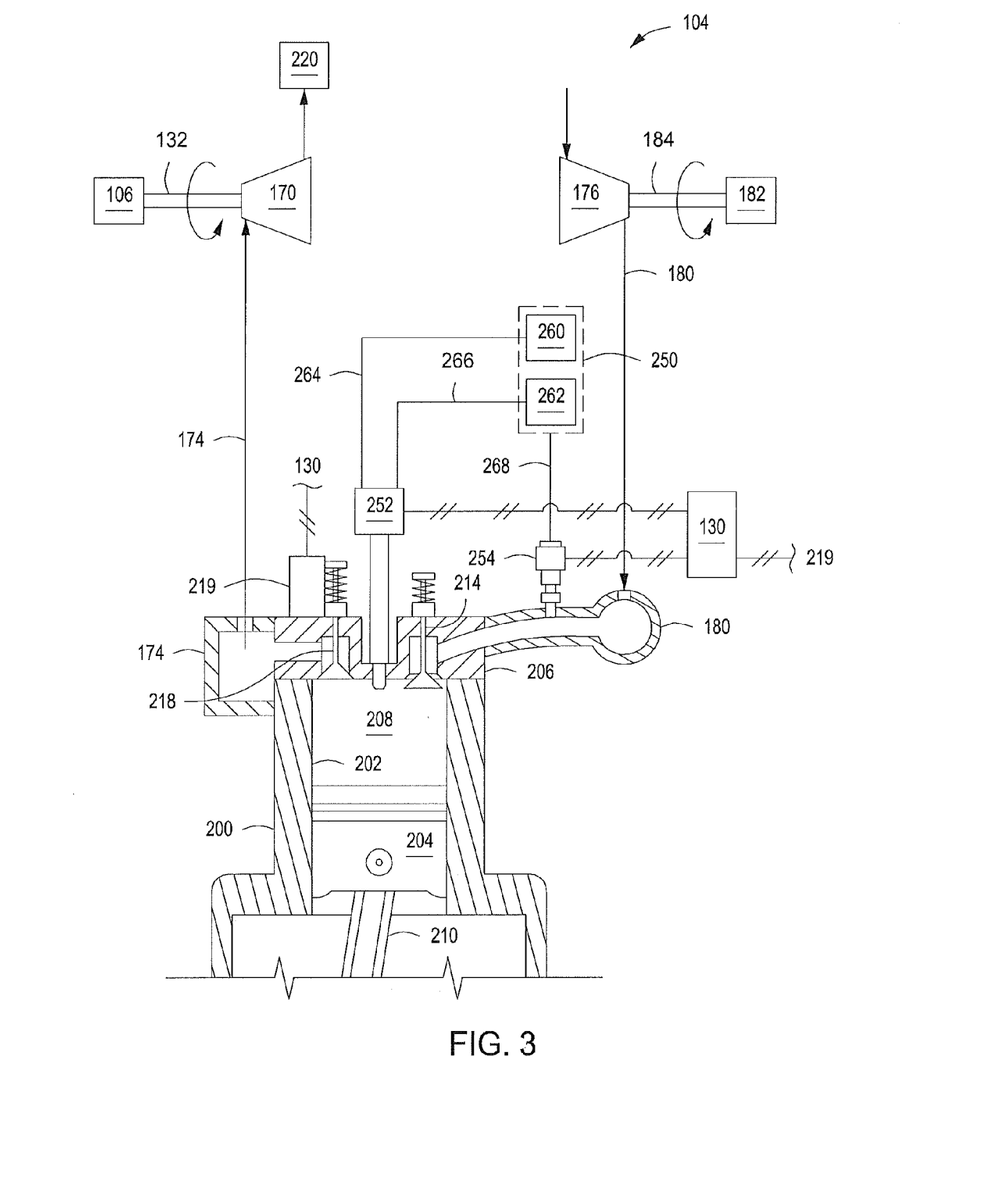
FIG. 3 shows a schematic view of an IC engine, according to an aspect of the disclosure.

FIG. 3 shows a schematic view of an IC engine 104, according to an aspect of the disclosure. The IC engine 104 includes a block 200 defining at least one cylinder bore 202 therein, at least one piston 204 disposed in sliding engagement with the cylinder bore 202, and a head 206 disposed on the block 200. The cylinder bore 202, the piston 204, and the head 206 define a combustion chamber 208. A volume of the combustion chamber 208 may vary with the location of the piston 204 relative to the head 206, such that the volume of the combustion chamber 208 is at a maximum when the piston 204 is located at Bottom Dead Center (BDC) of its stroke, and the volume of the combustion chamber 208 is at a minimum when the piston 204 is located at Top Dead Center (TDC) of its stroke.

The IC engine 104 may operate according to a four-stroke cycle, including an intake stroke (TDC to BDC), a compression stroke (BDC to TDC), an expansion stroke (TDC to BDC), and an exhaust stroke (BDC to TDC). Alternatively, the IC engine 104 may operate according to a two-stroke cycle, including a compression/exhaust stroke (BDC to TDC) and an expansion/exhaust/intake stroke (TDC to BDC).

The piston 204 is pivotally connected to the shaft 150 (see FIG. 2) via a connecting rod 210 for transmitting mechanical power therebetween. Although only one piston 204 and cylinder bore 202 are shown in FIG. 3, it will be appreciated that the IC engine 104 may be configured to include any number of pistons and cylinder bores to suit a particular design or application.

The IC engine 104 receives a flow of oxidizer from the intake conduit 180. One or more intake valves 214 effect selective fluid communication between the intake conduit 180 and the combustion chamber 208. The IC engine 104 discharges a flow of exhaust to an exhaust conduit 174. One or more exhaust valves 218 effect selective fluid communication between the combustion chamber 208 and the exhaust conduit 174. The intake valves 214 and the exhaust valves 218 may be actuated by a cam/push-rod/rocker arm assembly (not shown), a solenoid actuator, a hydraulic actuator, or by any other cylinder valve actuator known in the art to open or close intake and exhaust valves.

An actuator for one or more of the exhaust valves 218 may include a variable valve timing (VVT) mechanism 219. The VVT mechanism 219 is configured to provide flexibility in the timing of exhaust valve 218 operation. The VVT mechanism 219 may provide flexibility in the timing of exhaust valve opening, exhaust valve closing, or combinations thereof. Non-limiting examples of apparatus and methods for effecting VVT are described in US Patent Application Publication No. 2014/0245979, US Patent Application Publication No. 2012/0125276, and US Patent Application Publication No. 2003/0116124, the disclosures of which are hereby incorporated by reference to the extent they do not contradict aspects of the present disclosure.

The exhaust conduit 174 may incorporate one or more exhaust aftertreatment modules 220 for trapping exhaust constituents, converting an exhaust constituent from one composition to another composition, or both. The one or more exhaust aftertreatment modules 220 may include a particulate filter, a nitrogen oxides (NOx) conversion module, an oxidation catalyst, combinations thereof, or any other exhaust aftertreatment device known in the art. According to an aspect of the disclosure, the IC engine 104 does not include a particulate filter.

The turbine 170 receives a flow of exhaust gas via the exhaust conduit 174 and extracts mechanical work from the exhaust gas by expansion of the exhaust gas therethrough. The mechanical work extracted by the turbine 170 from the flow of exhaust gas is transmitted to the generator 106 via the shaft 132. The compressor 176 receives a flow of oxidizer, for example, ambient air, and performs work on the flow of oxidizer by compression thereof. The flow of compressed oxidizer is discharged from the compressor 176 into the intake conduit 180.

The IC engine 104 receives combustible fuel from a fuel supply system 250. The fuel supply system 250 may include fuel storage, compressors, pumps, valves, regulators, instrumentation, or any other elements known in the art to be useful for supplying a flow of fuel. The IC engine 104 includes a direct fuel injector 252 disposed in direct fluid communication with the combustion chamber 208, a port fuel injector 254 disposed in the intake conduit 180 upstream of the intake valve 214, combinations thereof, or any other fuel injector arrangement known in the art. The direct fuel injector 252 and the port fuel injector 254 may each be operatively coupled to the controller 130 for control thereof.

The fuel supply system 250 may include a first fuel supply 260, a second fuel supply 262, or both. The direct fuel injector 252 may be in fluid communication with the first fuel supply 260 via a first fuel conduit 264, the second fuel supply 262 via a second fuel conduit 266, or both. The port fuel injector 254 may be in fluid communication with the second fuel supply 262 via a third fuel conduit 268.

According to an aspect of the disclosure, the first fuel supply 260 is a liquid fuel supply that delivers a liquid fuel to the combustion chamber 208. The liquid fuel may include distillate diesel, biodiesel, dimethyl ether, ethanol, methanol, seed oils, liquefied natural gas (LNG), liquefied petroleum gas (LPG), Fischer-Tropsch derived fuel, combinations thereof, or any other combustible liquid known in the art to enable compression ignition in a reciprocating IC engine. According to another aspect of the disclosure, the first fuel supply 260 is a distillate diesel fuel supply.

According to an aspect of the disclosure, the second fuel supply 262 is a gaseous fuel supply that delivers a gaseous fuel to the combustion chamber 208. The gaseous fuel may include natural gas, methane, propane, hydrogen, biogas, syngas, combinations thereof, or any other combustible gas known in the art. According to another aspect of the disclosure, the gaseous fuel is natural gas. According to yet another aspect of the disclosure, the gaseous fuel is a combustible gas comprising at least 50% methane by mole.

The direct fuel injector 252 is configured to effect selective fluid communication between the fuel supply system 250 and the combustion chamber 208. For example, the direct fuel injector 252 may assume any one of the following four fluid configurations. According to a first configuration, the direct fuel injector 252 blocks fluid communication between both the first fuel supply 260 and the second fuel supply 262, and the combustion chamber 208. According to a second configuration, the direct fuel injector 252 blocks fluid communication between the first fuel supply 260 and the combustion chamber 208 and effects fluid communication between the second fuel supply 262 and the combustion chamber 208. According to a third configuration, the direct fuel injector 252 effects fluid communication between the first fuel supply 260 and the combustion chamber 208 and blocks fluid communication between the second fuel supply 262 and the combustion chamber 208. According to a fourth configuration, the direct fuel injector 252 effects fluid communication between both the first fuel supply 260 and the second fuel supply 262, and the combustion chamber 208.

The direct fuel injector 252 may include an actuator configured to change the fluid configuration of the direct fuel injector 252 under the control of the controller 130. The actuator for the direct fuel injector 252 may include a solenoid actuator, a hydraulic actuator, a pneumatic actuator, a mechanical actuator, such as, for example a cam actuator, combinations thereof, or any other fuel injector actuator known in the art.

Similarly, the port fuel injector 254 is configured to effect selective fluid communication between the fuel supply system 250 and the combustion chamber 208. For example, the port fuel injector 254 may assume one of the two following fluid configurations. According to a first configuration, the port fuel injector 254 blocks fluid communication between the second fuel supply 262 and the intake conduit 180. According to a second configuration, the port fuel injector 254 effects fluid communication between the second fuel supply 262 and the intake duct.

The port fuel injector 254 may include an actuator configured to change the fluid configuration of the port fuel injector 254 under the control of the controller 130. The actuator for the port fuel injector 254 may include a solenoid actuator, a hydraulic actuator, a pneumatic actuator, a mechanical actuator, such as, for example a cam actuator, combinations thereof, or any other fuel injector actuator known in the art.

In place of, or in addition to, the direct fuel injector 252, the IC engine 104 may have a spark plug having a cathode and an anode in fluid communication with the combustion chamber 208, and electrical communication with the controller 130, such that the controller 130 may effect a spark across a gap between the cathode and the anode at a selected timing. Accordingly, the spark plug may be used to initiate or time a combustion event in the combustion chamber 208 under the control of the controller 130.

According to an aspect of the disclosure, the IC engine 104 is a spark ignition engine fueled by a gaseous fuel, such as natural gas. According to another aspect of the disclosure, the IC engine 104 is a compression ignition engine primarily fueled by a gaseous fuel, such as natural gas, which is ignited by a pilot injection of fuel, such as distillate diesel via the direct fuel injector 252. According to yet another aspect of the disclosure, the IC engine 104 is a homogeneous charge compression ignition (HCCI) engine fueled by a gaseous fuel, such as natural gas.

In an HCCI configuration or a spark-ignited configuration, most, if not all of the fuel may be gaseous fuel from the second fuel supply 262. In a piloted compression ignition configuration, most of the fuel may be gaseous fuel from the second fuel supply 262, while the pilot injection is a fuel supplied by the first fuel supply 260.

INDUSTRIAL APPLICABILITY

The present disclosure is generally applicable hybrid powertrains, and more particularly, to series-parallel hybrid powertrains and methods of operating the same.

A series-parallel hybrid powertrain, also known as power-split hybrid powertrains, may offer advantages for powering the machine 100. For example, compared to a series hybrid powertrain, the series-parallel hybrid powertrain 102 may derive power for performing work on the load 140 from a combination of both the IC engine 104 and the generator 106. Further, the parallel power path through the generator 106 may decouple the charging requirements for the energy storage device 108 from the operating state of the IC engine 104. Conversely, compared to a pure parallel hybrid powertrain, the series-parallel hybrid powertrain 102 may decouple the speed of the IC engine 104 from the instantaneous power demand of the machine 100.

Conventional series-parallel hybrid powertrains may use a mechanical epicyclic gear assembly to allocate shaft power out of an IC engine between a series power path through a generator and a parallel power path through a mechanical transmission. However, such epicyclic gear assemblies may pose challenges with respect to gear lubrication and wear, noise, vibration, or combinations thereof. Further, the packaging or operability of epicyclic gear assemblies may be limited by the physical dimensions of gears composing the epicyclic gear assembly.

Aspects of the disclosure address these challenges, and other problems in the art, by providing a series-parallel hybrid powertrain 102, including a series power path through the exhaust turbine 170 and a parallel power path through the IC engine 104 output shaft 150, where the allocation of power between the series power path and the parallel power path may be varied through control of exhaust energy leaving the IC engine 104.

According to an aspect of the disclosure, the allocation of power to the series power path may be increased by advancing an exhaust valve 218 opening time, or decreased by retarding the exhaust valve 218 opening time. Advancing the exhaust valve 218 opening time via the controller 130 may decrease power to the parallel power path via the IC engine 104 output shaft 150 by bleeding fluid energy away from the combustion chamber 208 before completion of a power stroke of the piston 204, and thereby increase the energy of the exhaust flow available to the turbine 170 via the exhaust conduit 174. In turn, increased energy in the exhaust flow available to the turbine 170 may increase the power output from the series power path via the turbine shaft 132. The increased energy of the exhaust flow may manifest as an increased temperature of the exhaust flow, an increased pressure of the exhaust flow, or combinations thereof.

Conversely, retarding the exhaust valve 218 opening time via the controller 130 may increase power to the parallel power path via the IC engine 104 output shaft 150 by extracting more energy from the fluid in the combustion chamber 208 through expansion work against the piston 204, before discharging the fluid from the combustion chamber 208 into the exhaust conduit 174, and thereby decrease the energy of the exhaust flow available to the turbine 170 via the exhaust conduit 174. In turn, decreased energy in the exhaust flow available to the turbine 170 may decrease the power output from the series power path via the turbine shaft 132. The decreased energy of the exhaust flow may manifest as a decreased temperature of the exhaust flow, a decreased pressure of the exhaust flow, or combinations thereof.

According to another aspect of the disclosure, the allocation of power to the series power path may be increased by retarding a combustion timing within the combustion chamber 208, or decreased by advancing the combustion timing within the combustion chamber 208. Retarding combustion timing via the controller 130 may decrease power to the parallel power path via the IC engine 104 output shaft 150 by decreasing time-integrated pressure on the piston 204 during the expansion stroke, and thereby increase the energy of the exhaust flow available to the turbine 170 via the exhaust conduit 174. In turn, increased energy in the exhaust flow available to the turbine 170 may increase the power output from the series power path via the turbine shaft 132. The combustion timing within the combustion chamber 208 may be retarded by retarding the initiation of a spark by the spark plug, retarding the initiation of a pilot injection of fuel from the direct fuel injector 252, combinations thereof, or any other method known in the art for retarding a combustion timing.

Conversely, advancing the combustion timing within the combustion chamber 208 via the controller 130 may increase power to the parallel power path via the IC engine 104 output shaft 150 by increasing time-integrated pressure on the piston 204 during the expansion stroke, before discharging the fluid from the combustion chamber 208 into the exhaust conduit 174, and thereby decrease the energy of the exhaust flow available to the turbine 170 via the exhaust conduit 174. In turn, decreased energy in the exhaust flow available to the turbine 170 may decrease the power output from the series power path via the turbine shaft 132. The combustion timing within the combustion chamber 208 may be advanced by advancing the initiation of a spark by the spark plug, advancing the initiation of a pilot injection of fuel from the direct fuel injector 252, combinations thereof, or any other method known in the art for advancing a combustion timing.

According to an aspect of the disclosure, the combustion timing within the combustion chamber 208 may be controlled by the controller 130 to maximize an indicated thermal efficiency for the IC engine 104. According to another aspect of the disclosure, the combustion timing within the combustion chamber 208 may be controlled to optimize power transfer to the generator 106 via the turbine 170 output shaft 132, for example, to achieve a target charging rate for the energy storage device 108.

It will be appreciated that fuel flow to the combustion chamber 208 may be increased in conjunction with either advancing the exhaust valve 218 opening or retarding combustion timing, to further increase exhaust energy available to the turbine 170. It will also be appreciated that airflow through the compressor 176 may be adjusted through control of electric power to the motor 182 to further tailor the allocation of power derived from the series power path and the parallel power path. The electrically-driven compressor 176 may provide other advantages to the series-parallel hybrid powertrain 102 by improving responsiveness of the IC engine 104, improving cold-start capability, utilizing regenerative energy capture or energy from the electric grid 164 to drive the compressor 176, improving control of the fuel-air mixture strength within the combustion chamber 208, or combinations thereof, for example.

According to an aspect of the disclosure, the controller 130 is configured to operate the IC engine 104 at a constant speed or a substantially constant speed. Operating the IC engine 104 at a constant speed or a substantially constant speed may promote thermal efficiency of the series-parallel hybrid powertrain 102 over one or more duty cycles of the machine 100, by enabling the IC engine 104, the compressor 176, the turbine 170, or combinations thereof, to operate consistently at points of maximum efficiency throughout duty cycles of the machine 100. Further, a CVT transmission 146 may be simplified in structure or operation because the motor-generator 144 may supplement shaft power from the IC engine 104 near the highest speed range for the shaft 142, which is coupled to the load 140.

Aspects of the disclosure may provide cost advantages, simplicity advantages, or both by providing a series-parallel hybrid powertrain 102 that does not require a separate epicyclic gear assembly, or the like, to effect the power-splitting function between a series power path and a parallel power path.

According to an aspect of the disclosure, the exhaust aftertreatment module 220 does not require a diesel particulate filter (DPF), at least in part, because the discreet operating speeds of the IC engine 104 may be tuned to control particulate emissions without further aftertreatment. According to another aspect of the disclosure, the exhaust aftertreatment module 220 includes a selective catalytic reduction (SCR) catalyst or an adsorber for control of emissions of oxides of nitrogen (NOx) from the IC engine 104, but does not include a DPF.

Compared to a conventional turbocharger, where the turbine and the associated compressor are fixed to a common rotating shaft, and therefore are constrained to operate at the same speed, aspects of the disclosure provide a compressor 176 that is driven by a motor 182, such that a rotational speed of the compressor 176 is independent of the rotational speed of the turbine 170. Independent control of the compressor 176 may allow improved control of air-fuel mixture strength in the combustion chamber 208, improved control over airflow delivered to the IC engine 104 via the intake conduit 180, or combinations thereof.

Further, aspects of the disclosure may provide cost and packaging advantages over conventional approaches by enabling an IC engine 104 with a reduced power rating, enabling an energy storage device 108 with a lower storage capacity, or combinations thereof, while simultaneously meeting peak power requirements for duty cycles of the machine 100.

Any of the methods or functions described herein may be performed by or controlled by the controller 130. Further, any of the methods or functions described herein may be embodied in a computer-readable non-transitory medium for causing the controller 130 to perform the methods or functions described herein. Such computer-readable non-transitory media may include magnetic disks, optical discs, solid state disk drives, combinations thereof, or any other computer-readable non-transitory medium known in the art.

Moreover, it will be appreciated that the methods and functions described herein may be incorporated into larger control schemes for an engine, a hybrid powertrain, a machine, or combinations thereof, including other methods and functions not described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A hybrid powertrain, comprising:
   an internal combustion engine;
   a load coupled to the internal combustion engine via a mechanical transmission for transmission of a first shaft power therebetween;
      wherein the mechanical transmission includes a continuously variable transmission (CVT) having an input mechanically coupled to an output of the internal combustion engine;
   a turbine fluidly coupled to an exhaust of the internal combustion engine;
   a generator operatively coupled to the turbine for transmission of a second shaft power therebetween, and electrically coupled to an electric battery;
   a motor-generator operatively coupled to the mechanical transmission for transmission of a third shaft power therebetween, and electrically coupled to the electric battery;
   a transfer gear box having a first input mechanically coupled to an output of the CVT, a second input mechanically coupled to the motor-generator, and an output mechanically coupled to the load; and
   a controller operatively coupled to the internal combustion engine, the controller being configured to adjust a relative proportion of the third shaft power compared to the first shaft power at least in part by adjusting at least one of a combustion timing of the internal combustion engine and an exhaust valve timing of the internal combustion engine.

2. The hybrid powertrain of claim 1, further comprising:
   a compressor in fluid communication with an air inlet of the internal combustion engine; and
   a motor operatively coupled to the compressor for transmission of a fourth shaft power therebetween, and electrically coupled to the electric battery.

3. The hybrid powertrain of claim 2, wherein the compressor is a first compressor, and
   wherein the hybrid powertrain does not include a second compressor operatively coupled to any turbine for transmission of a fifth shaft power therebetween.

4. The hybrid powertrain of claim 2, wherein the controller is further configured to adjust the fourth shaft power to at least in part maintain a constant speed of the internal combustion engine.

5. The hybrid powertrain of claim 2, wherein the compressor is free from a transmission of shaft power generated from an exhaust flow of the internal combustion engine.

6. The hybrid powertrain of claim 1, wherein an exhaust flowpath of the internal combustion engine does not include a particulate filter.

7. The hybrid powertrain of claim 1, wherein the controller is further configured to vary a load of the internal combustion engine while maintaining a speed of the internal combustion engine constant.

8. The hybrid powertrain of claim 1, wherein the controller is further configured to increase the relative proportion of the third shaft power to the first shaft power when the third shaft power is greater than a power required to drive the load.

9. The hybrid powertrain of claim 1, wherein the turbine is free from transmission of shaft power to a compressor.

10. The hybrid powertrain of claim 1, wherein the controller is further configured to increase the relative proportion of the third shaft power compared to the first shaft power by retarding the combustion timing of the internal combustion engine.

11. The hybrid powertrain of claim 10, wherein the controller is further configured to decrease the relative proportion of the third shaft power compared to the first shaft power by advancing the combustion timing of the internal combustion engine.

12. The hybrid powertrain of claim 1, wherein the controller is further configured to increase the relative proportion of the third shaft power compared to the first shaft power by advancing an exhaust valve timing of the internal combustion engine.

13. The hybrid powertrain of claim 12, wherein the controller is further configured to decrease the relative proportion of the third shaft power compared to the first shaft power by retarding an exhaust valve timing of the internal combustion engine.

14. A machine comprising a hybrid powertrain, the hybrid powertrain including:
an internal combustion engine;
a load coupled to the internal combustion engine via a mechanical transmission for transmission of a first shaft power therebetween;
wherein the mechanical transmission includes a continuously variable transmission (CVT) having an input mechanically coupled to an output of the internal combustion engine;
a turbine fluidly coupled to an exhaust of the internal combustion engine;
a generator operatively coupled to the turbine for transmission of a second shaft power therebetween, and electrically coupled to an electric battery;
a motor-generator operatively coupled to the mechanical transmission for transmission of a third shaft power therebetween, and electrically coupled to the electric battery;
a transfer gear box having a first input mechanically coupled to an output of the CVT, a second input mechanically coupled to the motor-generator, and an output mechanically coupled to the load; and
a controller operatively coupled to the internal combustion engine, the controller being configured to adjust a relative proportion of the third shaft power compared to the first shaft power at least in part by adjusting at least one of a combustion timing of the internal combustion engine and an exhaust valve timing of the internal combustion engine.

15. A method for operating a hybrid powertrain, the hybrid powertrain including a continuously variable transmission (CVT) having an input mechanically coupled to an output of an internal combustion engine, and a transfer gear box having
a first input mechanically coupled to an output of the CVT,
a second input mechanically coupled to a motor-generator, and
an output mechanically coupled to a load,
the method comprising:
transmitting a first shaft power from the internal combustion engine to the load via the first input of the transfer gear box;
extracting a second shaft power from an exhaust flow of the internal combustion engine via a turbine;
transmitting the second shaft power from the turbine to a generator;
transmitting a first electrical power from the generator to a motor-generator;
transmitting a third shaft power from the motor-generator to the load via the second input of the transfer gear box; and
adjusting a relative proportion of the third shaft power compared to the first shaft power at least in part by adjusting at least one of a combustion timing of the internal combustion engine and an exhaust valve timing of the internal combustion engine.

16. The method of claim 15, wherein the transmitting the first electrical power from the generator to a motor-generator includes
transmitting the first electrical power from the generator to a battery for storage of electrical power therein, and
transmitting the first electrical power from the battery to the motor-generator.

17. The method of claim 15, further comprising:
transmitting a second electrical power from a battery to a motor; and
transmitting a fourth shaft power from the motor to a compressor in fluid communication with the internal combustion engine.

18. The method of claim 15, further comprising operating the internal combustion engine at a constant speed independent of the load coupled to the hybrid powertrain.

19. The method of claim 15, wherein the adjusting the relative proportion of the third shaft power compared to the first shaft power includes increasing the relative proportion of the third shaft power compared to the first shaft power by at least one of retarding the combustion timing of the internal combustion engine, and advancing the exhaust valve timing of the internal combustion engine.

* * * * *

UNITED STATES PATENT AND TRADEMARK OFFICE
CERTIFICATE OF CORRECTION

PATENT NO.         : 9,500,124 B2                                   Page 1 of 1
APPLICATION NO.    : 14/540681
DATED              : November 22, 2016
INVENTOR(S)        : Xinyu Ge It is certified that error appears in the above-identified patent and that said Letters Patent is hereby corrected as shown below:

On the Title Page

Column 2, Item (74) (Attorney, Agent, or Firm), Line 1, delete "Baker & Hostetler LLP" and insert
-- Baker & Hostetler LLP; Hibshman Claim Construction PLLC --.

Signed and Sealed this
Eighteenth Day of April, 2017

Michelle K. Lee
*Director of the United States Patent and Trademark Office*